June 5, 1956  J. A. COMPTON  2,748,454
METHOD OF ASSEMBLING PRESSURE LOADED GEAR PUMPS
Filed July 19, 1950
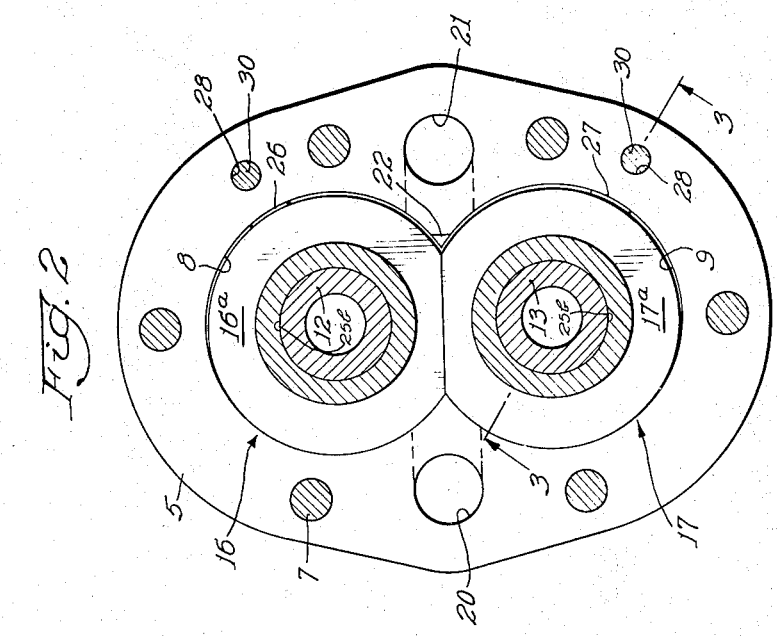
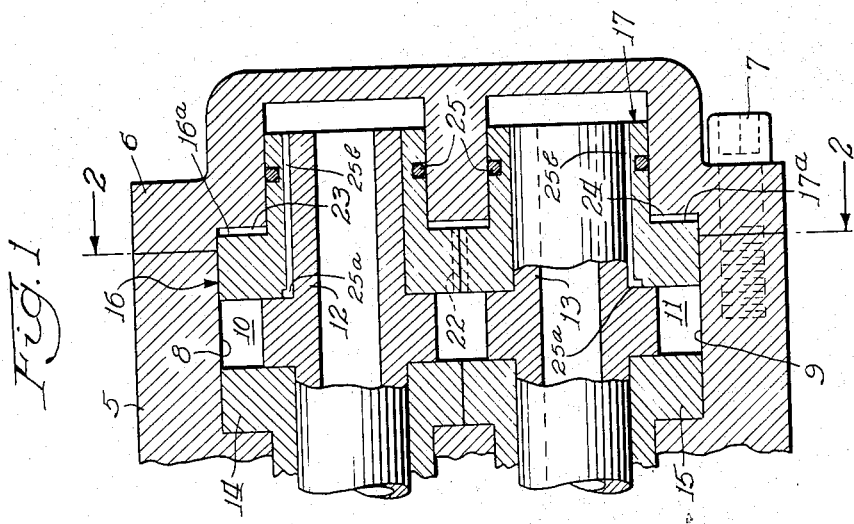
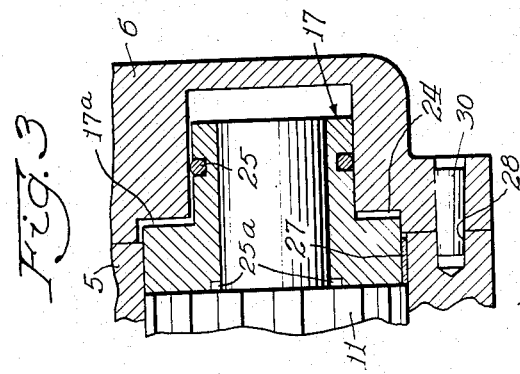
Inventor:
James A. Compton

United States Patent Office 2,748,454
Patented June 5, 1956

2,748,454

METHOD OF ASSEMBLING PRESSURE LOADED GEAR PUMPS

James A. Compton, South Euclid, Ohio, assignor to Borg-Warner Corporation, Chicago, Ill., a corporation of Illinois Application July 19, 1950, Serial No. 174,606

2 Claims. (Cl. 29—156.8)

This invention relates to a method of assembling pressure loaded type, intermeshing gear pumps, and to such pumps assembled according to this method.

In a pressure loaded, intermeshing gear type pump having one set of axially movable, pressure loadable bushings, a part of the output or discharge pressure of the pump is applied to the rear or motive surfaces of the axially adjustable bushings to urge these bushings into sealing engagement with their associated gears. As disclosed in U. S. Patent No. 2,420,622 to Roth et al., by carefully selecting the relative areas of the forward surfaces of the bushings and of the motive surfaces of the bushings, it is possible to control within very close limits the actual sealing pressure provided. In practice, this requires a somewhat higher effective pressure in the direction of establishing the seal than in the direction tending to open the seal.

Because the pressure loadable bushings must be made movable, a certain minimum clearance must be provided between the sides of the bushings and the adjacent sides of the chambers or bores in the pump housing in which the bushings are received. In practice, this clearance is actually very slight but it has been found that since the bushings may move either to one side or to the other of the chamber during assembly, occasionally a pump will be made in which the clearance of the bushings adjacent the inlet side of the pump is large enough, because of the corresponding reduction in clearance adjacent the discharge side of the pump due to lateral or transverse shifting of the bushings, to provide a substantial leakage path to inlet pressure. This, of course, reduces proportionately the efficiency of the pump.

An object of the present invention is to provide a new and improved method of assembling a pressure loaded type, intermeshing gear pump.

A further object of the present invention is to provide a new and improved pressure loaded type, intermeshing gear pump.

In accordance with this invention, a pressure loaded gear pump may be assembled by first inserting the axially movable, pressure loadable set of bushings in the main housing section in their usual position next to the intermeshing gears, and then pressing shims between the sides of the bushings and the wall of the housing chambers adjacent the discharge side so that the bushings are forced toward the inlet side of the housing. The cover housing section is then assembled on the pump body housing, omitting the usual sealing means. Then, with the parts held rigidly in position, a dowel hole is drilled through the flanged, mating portions of the two housing sections. Thereafter, the pump is disassembled, the shims removed, the usual sealing rings inserted and the pump reassembled. A dowel pin is inserted in the drilled hole and then the pump housing sections are bolted together. The dowel pin maintains the position of the bushings established by the shims.

Other objects and advantages of the present invention will be apparent from the following detailed description thereof taken in conjunction with the drawings wherein:

Fig. 1 is a fragmentary, axial, sectional view of a pressure loadable type, intermeshing gear pump constructed in accordance with the method of this invention; and Fig. 2 is a transverse, sectional view taken substantially along the line 2—2 of Fig. 1 showing the shims in position against the bushings; and Fig. 3 is a sectional view taken substantially along the lines 3—3 of Fig. 2, showing, however, the shims removed and a dowel pin in position.

Referring now to the drawings and particularly to Fig. 1 thereof, a pump generally similar to that shown in the aforementioned Roth et al. patent is illustrated comprising a sectional housing having a main body portion 5 and a right closure member or cover member 6. These sections are normally bolted together as by the bolts 7 and cooperate to define therewithin a pair of parallel axes, intersecting bores or pumping gear chambers 8 and 9 which are arranged to receive in complementary relationship intermeshing pumping gears 10 and 11, respectively. In the embodiment illustrated, the pumping gears have integrally formed therewith hollow journal shafts 12 and 13, respectively, and the left portions of the journal shafts 12 and 13 are received in conventional flanged bushings 14 and 15 mounted in the left portions of the pumping gear chambers 8 and 9. The right portions of the gear journals are received, respectively, in axially adjustable, pressure loadable flanged bushings 16 and 17 mounted in the right side of the pumping gear chambers.

In the embodiment illustrated, the upper pumping gear 10 is the driving gear and is rotated in a clockwise direction, as viewed in Fig. 2. In accordance with conventional pump design practice the journal shaft of the upper gear may, therefore, be extended to the left, as viewed in Fig. 1, and coupled to a suitable power source. Low pressure liquid is introduced into the pump housing at inlet 20 formed in the left side of the pump housing, as viewed in Fig. 2, and high pressure liquid is discharged from the pump housing through outlet 21 formed in the right side of the housing, the inlet and outlet ports communicating with the inlet and discharge areas of the intermeshing pumping gears. The pressure loadable bushings are normally fitted into the bores with sufficient clearance to permit slight axial movement of the bushings with respect to the bores to establish the desired, pressure loaded seal during operation of the pump.

In the operation of a pump of this type, discharge pressure generated by the intermeshing gears may be communicated from the outlet or discharge side thereof to the annular pressure loading areas at the back of the bushing, designated 16–a and 17–a in the drawings through an axially extending passage 22 formed between the peripheries of the flanged portions of the bushings on the discharge side of the pump at the point of convergence of the flanged portions of the bushings. Areas 16–a and 17–a cooperate with the adjacent walls of the housing bores 8 and 9 and the peripheries of the barrel portions of the bushings 16 and 17 to define annular pressure loading chambers 23 and 24, respectively. The passage 22 extends from the discharge side of the gears to the right, as viewed in Fig. 1, to the intercommunicating portions of the pressure loading chambers 23 and 24 at their point of juncture.

Escape of pressure rearwardly from the pressure loading surfaces is substantially prevented by means of an O-ring seal 25 disposed about the periphery of the rear or barrel portion of each bushing in a suitable annular groove formed in the periphery of the bushing or in the adjacent bore wall. Pressure leaking past the O-ring seal may be vented to inlet pressure or to a zone of intermediate pressure in accordance with conventional pressure loaded pump practice as set forth in the abovereferenced Roth et al. patent and as described in this patent, in order to control the degree of pressure loading, a relief recess or chamber 25–a is formed either in the gear side face engaging surface of each of the pressure loadable bushings or in the gear side faces, the relief recess being located radially inwardly of the roots of the gear teeth and communicated to a zone of lower than discharge pressure. An axially extending passage 25–b may be formed in the cylindrical inner wall or bore of each of the pressure loadable bushings to provide communication between these relief recesses and the aforementioned inlet or intermediate pressure zone.

Since it is necessary in order to permit the slight axial movement required of the bushings in order to establish a seal, to fit the bushings with some clearance in the bushing receiving chambers the bushings may actually be assembled in such manner that more clearance is provided adjacent the inlet side of the pump than adjacent the discharge side of the pump, that is to say that the axially movable bushings may be slightly off-centered with respect to the axis of the bushing receiving chambers and located somewhat nearer the discharge port than the inlet port. Since, in the operation of the pump, the pressure applied to the pressure loading chambers 23 and 24 is substantially equivalent to discharge pressure, the leakage path provided by the excessive clearance occurring when the bushings are positioned nearer to the discharge port than to the inlet port may be sufficient to materially reduce the efficiency of the pump.

It has been found in accordance with the present invention that this undesirable condition may be substantially eliminated by establishing the location of the bushings prior to final assembly of the pump in such manner that the clearance adjacent the inlet side of the pump is held to a minimum, and by providing means for maintaining this established relation after final assembly of the pump.

More particularly, in the assembly of the pump in accordance with the present invention, the bushings 14 and 15 are placed in the body housing section 5, the pumping gears 10 and 11 are then placed in position with their left journal sections, as viewed in Fig. 1, received within the tubular portions of the bushings 14 and 15. Then, the axially movable, pressure loadable bushings 16 and 17 are assembled in position on the pumping gears 10 and 11, with their left sides in contact with the right side faces of the pumping gears. Thin, wedge-shaped members or shims 26 and 27 are then inserted between the sides of the flanged portions of the axially movable bushings 16 and 17 and the adjacent side walls of the pump receiving chambers 8 and 9 in the body housing section 5, the shims being located on the discharge port side of the pump body housing so as to move the bushings 16 and 17 against the opposite wall of the pump body housing, that is, the walls of the chambers nearer the inlet side of the pump. Preferably, the shims are spaced angularly from the discharge port, as shown in Fig. 2, so that the lines of force or directions of shift of the bushings tend to converge in the area of the inlet port, thus tending to position the bushing flanges so that the sides of the flanged portion contact closely the chamber walls in the area of the inlet.

The pump cover section 6 is then assembled into place on the pump body housing, omitting the usual sealing means, and the two housing sections are then clamped securely in position so that dowel holes 28 may be drilled through the flanged mating portions of the housing sections 5 and 6. After drilling the dowel holes, the pump is disassembled, the shims removed and the pump reassembled, this time with the usual seals in place. Dowel pins 30 are then inserted in the drilled holes 28, thereby placing the two housing sections in the same relative positions which they occupied when the shims were used in the previous assembly operation. The holes and pins may be slightly tapered so that the pins may be wedged in place or the outer ends of the pins peened to secure the pins in the holes. The bolts 7 are then threaded into the housing sections and secured to complete the assembly of the pump.

As a result of this method of assembly, the finally assembled pump has the pressure loadable bushings located with the sides of their flanged portions contacting closely the adjacent walls of the pump chambers in the area of the inlet, thereby providing an effective seal and reducing to a minimum leakage in this area.

It will be understood that the actual shifting of the bushings by the shims is quite small and that the resultant displacement of the cover 6 with respect to the housing body section 5 is correspondingly slight. Accordingly, the usual clearance provided in the bolt-receiving holes in the pump housing is adequate to permit threading the bolts 7 into position despite the slight displacement of the cover 6 from the conventional location with respect to the body section 5. Also, while a single dowel pin and dowel hole may be employed, it will be evident that where two or more pins are employed with the pins spaced about the periphery of the housing a closer control of the location of the bushings is obtained.

In practice, it has been found that employing the invention not only materially reduces the numbers of rejects for failure to provide the required pumping efficiency but also permits wider tolerances in the fitting of the bushings in the pump. Heretofore, a bushing which was more than a slight amount smaller than the bore in which it was to be positioned had to be rejected because of the reduction in pumping efficiency that could result. The present invention, by establishing a minimum clearance in the area where leakage can be a factor, that is, the area adjacent the inlet or low pressure side of the pump, permits substantially greater latitude in the use of undersized bushings without serious loss in efficiency.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

What is claimed is:

1. The method of assembling a pressure loaded type, intermeshing gear pump having at least one set of pressure loadable bushings adapted to engage the gear side faces in sealing relation which comprises the steps of assembling the pressure loadable bushings in their housing section, displacing the bushings toward the inlet side of the housing section by inserting shims between the bushings and the housing section on the side thereof adjacent the discharge side of the pump, assembling the housing section and bushing with the shims in position with the remaining elements of the pump in such a manner that the bushings properly align the remaining elements of the pump, forming a dowel hole extending through the housing sections, disassembling the pump to remove the shims, reassembling the pump, inserting a dowel pin in the dowel hole to establish the relative position of the housing sections, and then securing the sections together to complete the assembly of the pump.

2. The method of assembling a pressure loaded type, intermeshing gear pump having at least one set of pressure loadable bushings adapted to engage the gear side faces in sealing relation which comprises the steps of assembling the pressure loadable bushings in their housing section omitting the usual sealing means, displacing the bushings toward the inlet side of the housing section by inserting shims between the bushings and the housing section on the side thereof adjacent and spaced angularly from the discharge side of the pump, assembling the housing section and bushing with the shims in position with the remaining elements of the pump in such a manner that the bushings properly align the remaining elements of the pump, forming a dowel hole extending through the housing sections, disassembling the pump to remove the shims, reassembling the pump including the usual sealing elements, inserting the dowel pin in the dowel hole to establish the relative positions of the housing sections, and then securing the sections together to complete the assembly of the pump.

References Cited in the file of this patent

UNITED STATES PATENTS

| Number | Name | Date |
|---|---|---|
| 1,329,827 | Crittall | Feb. 3, 1920 |
| 1,710,744 | Roe | Apr. 30, 1929 |
| 1,803,478 | Laukel | May 5, 1931 |
| 1,917,037 | Jessop et al. | July 4, 1933 |
| 1,938,203 | Witherell | Dec. 5, 1933 |
| 2,118,317 | Mader | May 24, 1938 |
| 2,126,200 | Linderman | Aug. 9, 1938 |
| 2,245,759 | Chrisman | June 17, 1941 |
| 2,397,168 | Touceda | Mar. 26, 1946 |
| 2,420,622 | Roth et al. | May 13, 1947 |
| 2,438,867 | Rockwell et al. | Mar. 30, 1948 |
| 2,491,677 | McCulloch | Dec. 20, 1949 |
| 2,491,678 | McCulloch | Dec. 20, 1949 |
| 2,492,935 | McCulloch | Dec. 27, 1949 |
| 2,505,197 | McCulloch | Apr. 25, 1950 |
| 2,527,941 | Lauck et al. | Oct. 31, 1950 |
| 2,542,405 | Fink | Feb. 20, 1951 |